United States Patent Office 2,849,380
Patented Aug. 26, 1958

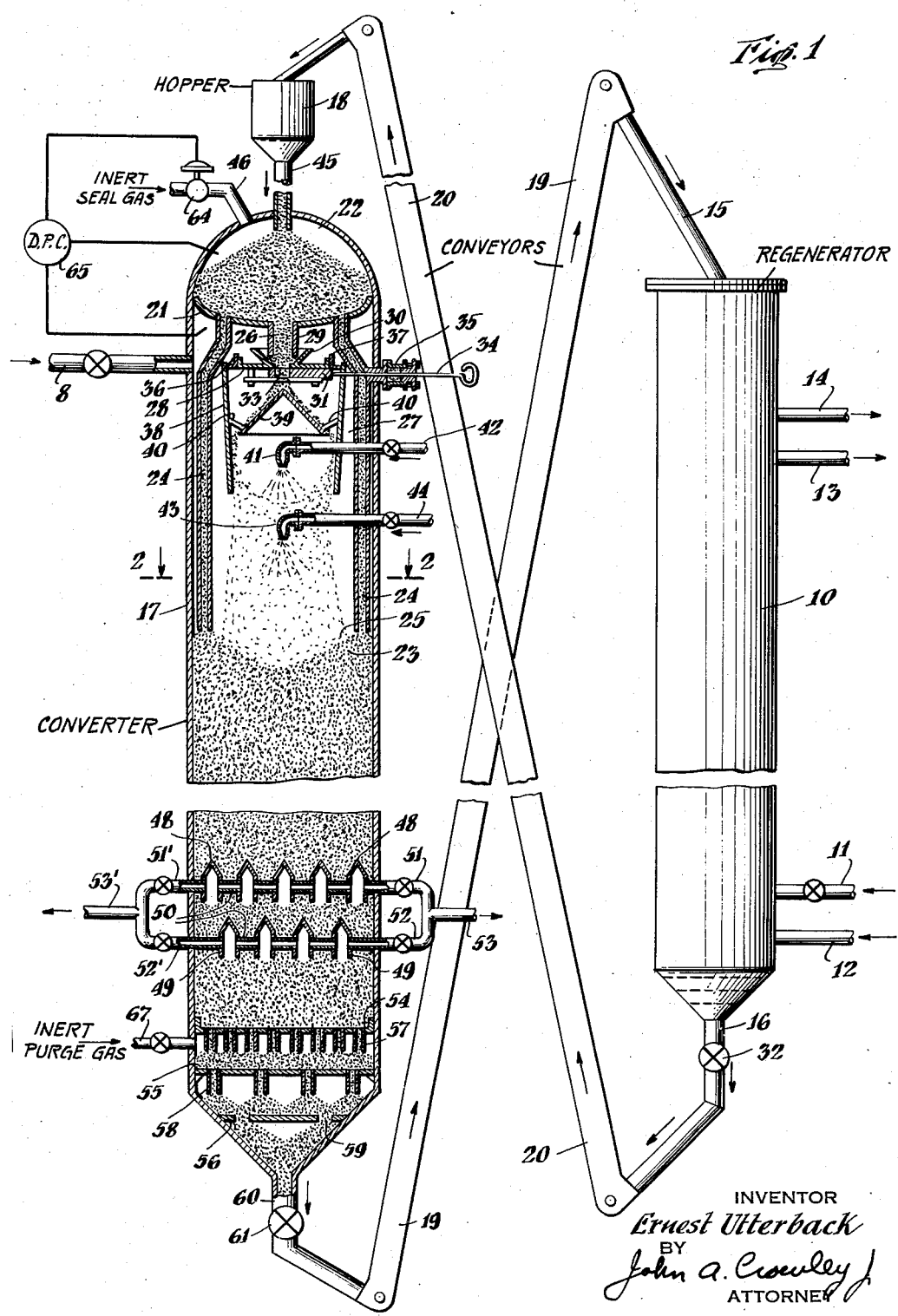

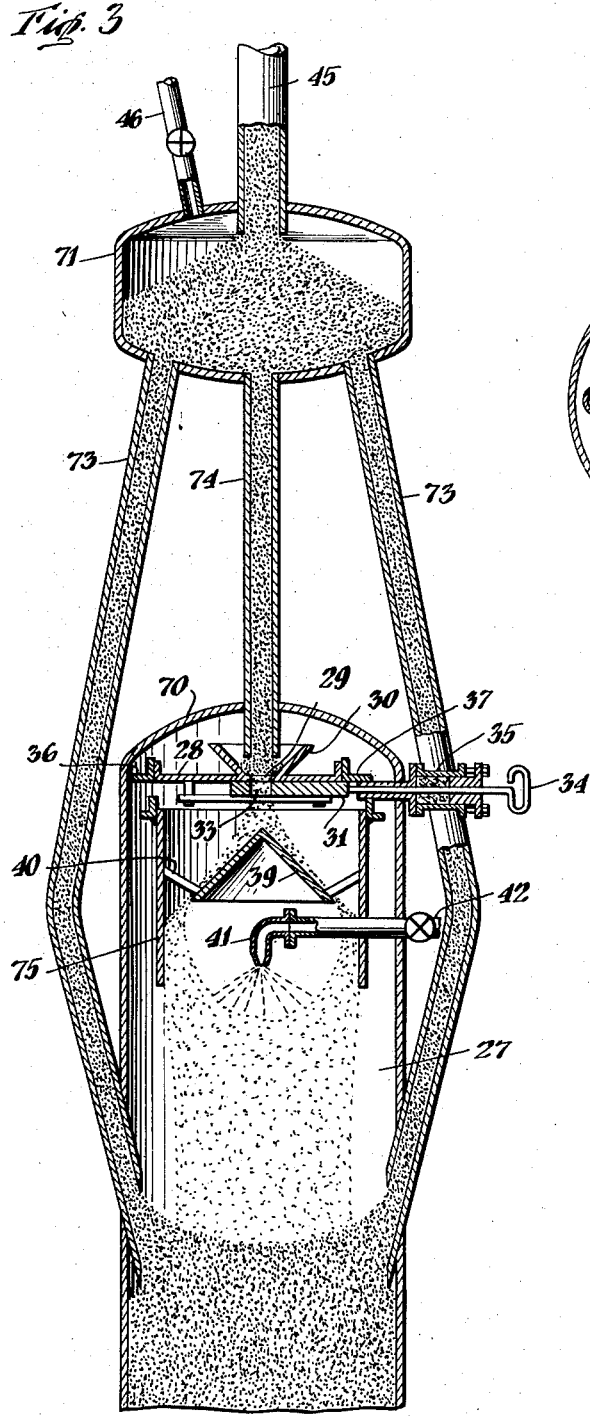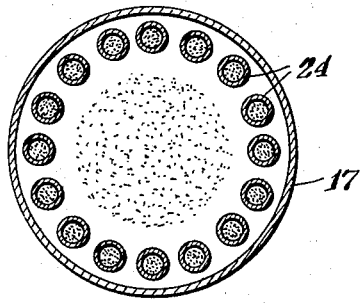

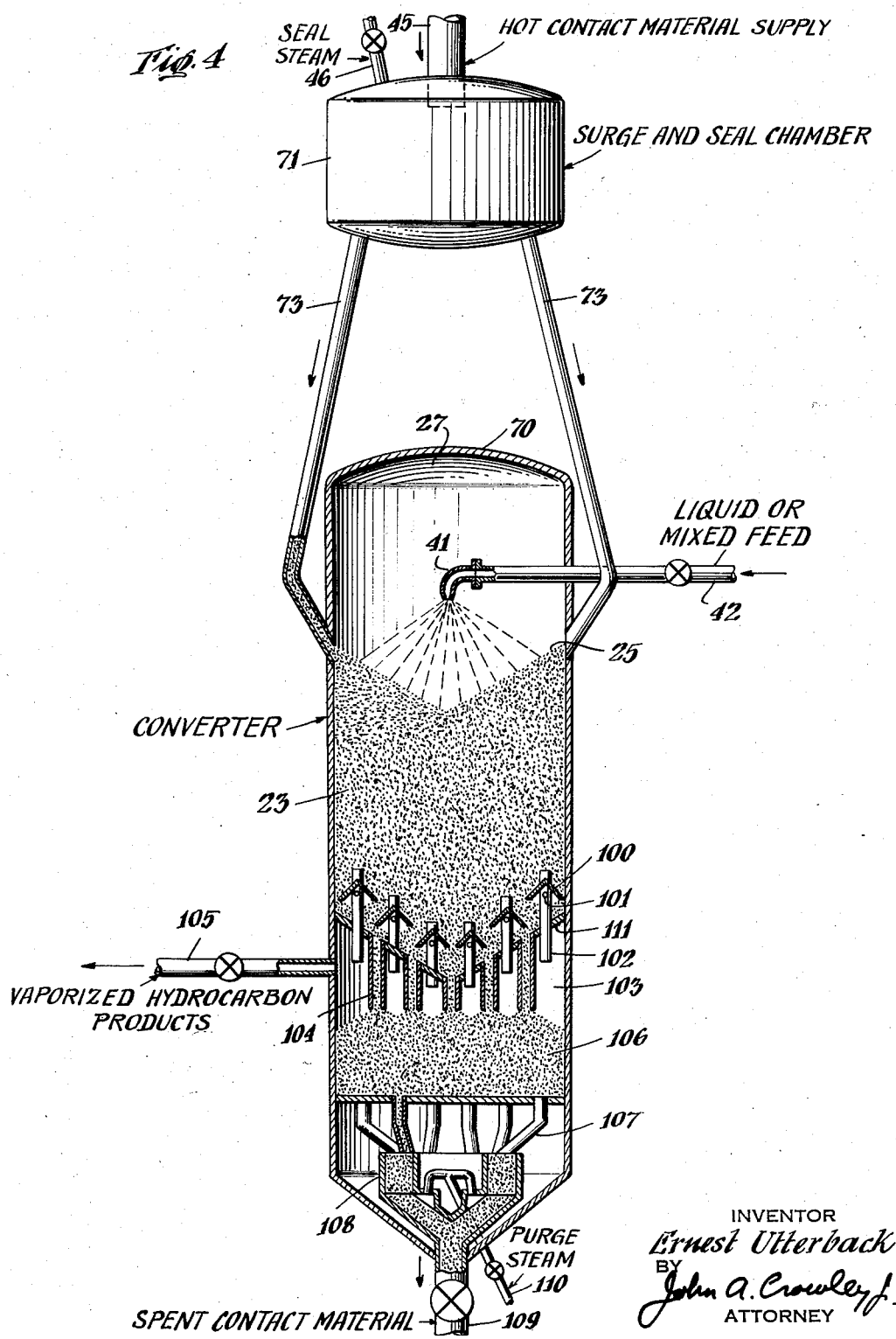

2,849,380

METHOD AND APPARATUS FOR CATALYTIC CONVERSION OF LIQUID FEEDS

Ernest Utterback, New York, N. Y., assignor to Socony Mobil Oil Company, Inc., a corporation of New York Application March 31, 1954, Serial No. 419,958

11 Claims. (Cl. 196—52)

This application is a continuation-in-part of application Serial Number 89,264 now abandoned, filed in the United States Patent Office April 23, 1949, which latter is a division of application Serial Number 719,724, filed January 2, 1947, now U. S. Patent No. 2,574,850.

This invention has to do with a method and apparatus for conversion of high boiling liquid hydrocarbons or mixed phase hydrocarbons to lower boiling hydrocarbons in the presence of a moving particle-form contact mass material which may or may not exhibit catalytic properties with respect to the conversion reaction. Typical of such processes is the catalytic conversion of heated liquid hydrocarbons to lower boiling gasoline containing gaseous products by the contacting of a high boiling liquid charge at temperatures of the order of 850° F. and upwards with a particle-form absorbent catalytic material. Other exemplary processes are the thermal visbreaking, coking or cracking of liquid or mixed phase hydrocarbon charge by contact with heated particle-form inert contact materials.

In such processes wherein the contact material is catalytic in nature it may partake of the nature of natural or treated clays, bauxite, activated alumina or synthetic associations of silica, alumina or silica and alumina to which other substances such as certain metallic oxides may be added in small amounts for specific purposes. When the contact material is inert in character, it may partake of the form of refractory materials such as zirkite, corhart material, or mullite or it may partake of the form of stones or metallic particles or balls.

This invention is specifically directed to certain method and apparatus improvements in a hydrocarbon conversion system wherein the contact material passes cyclically through a conversion zone wherein it is contacted at suitable conversion temperatures with a liquid or mixed phase high boiling liquid hydrocarbon charge to effect conversion thereof and then through a regeneration or reconditioning zone wherein it is contacted at elevated temperatures with a suitable gas for conditioning said contact material to a condition suitable for reuse in said conversion zone.

A type of conversion system which has met with wide commercial success because of its practical advantages is one wherein the contact material moves as a substantially compact column within the conversion zone. In such systems it has been customary to supply the contact material into the conversion chamber through one or more tubes extending downwardly through a short upper section of said chamber and terminating at the surface of the column of contact material within said chamber. When a liquid or mixed phase hydrocarbon charge is to be converted it is desirable to supply all or a large part of the heat required for conversion in the incoming contact material. This means that the incoming contact material and the tubes through which it enters and other metal surfaces in the upper section of the conversion vessel exist at temperatures sufficiently high to cause, upon contact by the liquid hydrocarbon charge, rapid conversion of said charge. As a result, there is a marked tendency for coke to form on the hot tubes and metal surfaces in the upper section of the conversion vessel. This coke eventually breaks off from the metal surfaces in large chunks which pass downwardly through the converter and plug up restricted passages for solid flow near the lower end of the converter and in other portions of the cyclic system.

A major object of this invention is the provision in a system for conversion of liquid or mixed phase hydrocarbons in the presence of a particle-form contact material of an improved method and apparatus for hydrocarbon and contact material introduction to the conversion zone which avoids the difficulties hereinabove described.

A specific object is the provision in a continuous cyclic process for conversion of high boiling liquid and mixed phase hydrocarbon charges to lower boiling products in the presence of a moving bed of particle-form contact material of an improved method and apparatus for distributing the liquid charge onto the bed surface and for replenishing the bed with hot contact material while avoiding coke build up on the contact material supply passages.

These and other objects of the invention will become apparent from the following description of the invention.

In one form of this invention a substantially compact bed of particle-form contact material is maintained within a lower portion of a confined conversion zone while a gas space (plenum space) is maintained above and open to the bed surface in an upper portion of the conversion zone. Liquid or mixed phase hydrocarbon charge is sprayed downwardly toward the bed from a location or locations located a substantial distance above the bed surface positioned centrally of the horizontal cross-section of the conversion zone. The liquid is caused to move downwardly through only a central portion of the gas space and then the hydrocarbons pass downwardly through the bed so as to become converted to lower boiling products existing in the gaseous phase under the elevated conversion temperature. The conversion products are withdrawn from a lower portion of the bed in the gaseous phase, while contact material bearing a carbonaceous deposit is separately withdrawn from the lower section of the bed. Fresh contact material is supplied to the bed surface at a suitable conversion supporting temperature through a plurality of confining passages which conduct the contact material downwardly to a plurality of points spaced around or near the periphery of the bed at its surface level. The passages circumvent at least that central portion of the gas space which extends between the liquid spray nozzle and the bed surface either by extending downwardly near the wall of the conversion zone housing or by completely by-passing the portion of the housing occupied by the gas space and entering the housing initially at the level of the bed surface. In this manner contact of the liquid charge with the hot contact material supply passages is essentially avoided.

The invention may be most readily understood by reference to the drawings of which Figure 1 is an elevational view, partially in section showing a form of the invention incorporating a further novel improvement involving a central curtain of feed contact material.

Figure 2 is a sectional view along line 2—2 of Figure 1.

Figure 3 is an elevational view, in section showing the upper portion of a conversion vessel incorporating a modified form of this invention.

Figure 4 is an elevational view, partly in section showing a preferred form of this invention.

All of these drawings are highly diagrammatic in form.

Turning now to Figure 1, we find a diagrammatic flow sketch of a continuous hydrocarbon conversion process. In Figure 1, there is shown a regeneration vessel 10, provided with combustion supporting gas inlet 11 and heat exchange fluid inlet 12 near its lower end and flue gas outlet 13 and heat exchange fluid outlet 14 near its upper end. The heat exchange fluid inlet and outlet connect into heat transfer tubes (not shown) distributed within the regenerator. Also provided is a solid material inlet 15 at the top of the regenerator and a solid material outlet 16 at the lower end thereof bearing a flow control valve 32. It will be understood that regenerators of other construction may be substituted for that shown within the scope of this invention as long as such modified constructions permit combustion regeneration of moving particles of spent contact mass materials at controlled elevated temperatures. In systems wherein the contact material is an inert material, the vessel 10 may take the form of a reconditioning apparatus in whatever form may be required for conditioning the contact material for reuse in the conversion zone. Also shown in Figure 1 is a converter 17, a supply hopper 18 located thereabove and conveyors 19 and 20 adapted to transfer hot contact material particles between the regenerator and converter vessels. The conveyors may take the form of continuous bucket elevators for example. Extending across the upper section of vessel 17 is a partition 21 which serves to provide a seal chamber 22 in the upper end of vessel 17 and a conversion chamber 23 therebelow. A plurality of spaced conduits 24, which may be arranged on a circular pattern as shown in Figure 2, depend from partition 21 to a level therebelow in the conversion chamber 23. It will be noted that the conduits 24 serve as passages for solid flow from seal chamber 22 to the surface 25 of the contact material column within the conversion chamber and that the conduits extend only through that portion of the horizontal cross-sectional area of the upper portion of the chamber which is near the outer periphery of said chamber. Another conduit 26 extends downwardly from a central portion of partition 21 to a level in the upper section of gas space 27 in the conversion chamber. A flow throttling device is provided below the lower end of the conduit 26. The flow throttling device broadly consists of a plate 28 having a hole 29 therein and a receiving funnel 30 positioned around the hole and a slide plate 31 therebelow which may be adjusted so that a hole 33 therein coincides partially or entirely with the hole 29 in plate 28 or so as to entirely block the flow through hole 29. A rod 34 is connected to the slide plate 31 and passes through stuffing box 35 on the vessel shell to permit adjustment of the throttling device from a point outside the vessel 17. The throttling device is supported by means of angle irons 36 and 37 which extend across the chamber in a direction perpendicular to the face of the drawing. Also supported by the angle irons 36 and 37 is a skirt 38 which is open on either end and positioned centrally with its axis vertical within the vessel 17. The skirt 38 tapers inwardly slightly so as to direct solid flow toward the center of the chamber. A conical shaped baffle 39 is supported by rods 40 substantially centrally within the skirt 38 and below the flow throttling device. The diameter of the base of the baffle 39 is less than that of the skirt 38 so as to provide an annular space for solid flow therebetween. A liquid spray device 41 is positioned substantially centrally of the vessel cross-sectional area adjacent the lower end of skirt 38. Liquid or mixed phase hydrocarbon charge may be supplied to the spray device 41 through pipe 42. A similar spray 43 and feed pipe 44 may be provided at a lower level in gas space 27. A contact material gravity feed leg 45 extends between hopper 18 and seal chamber 22 and a conduit 46 connects into seal chamber 22 for introduction of an inert gas thereinto. In the lower section of the vessel 17 there are provided two vertically spaced rows of spaced gable-roofed gas collecting troughs 48 and 49. Adjacent troughs are connected by means of nipples 50, and feed pipes 51 and 52 and 51' and 52' connect into the end troughs in rows 48 and 49, respectively. The pipes 51 and 52 and 51' and 52' are in turn manifolded into outlet pipes 53 and 53' respectively on opposite sides of the vessel. Below the levels of the collector troughs are provided three spaced partitions 54, 55 and 56. A plurality of uniformly distributed circular rows of nipples 57 depend from the uppermost partition 54 and a lesser number of rows of nipples 58 depend from the next lower partition 55. The nipples 58 are horizontally staggered proportionately between the nipples 57 thereabove. A circular row of holes 59 are provided in the lowermost partition 56, the row of holes being horizontally staggered with respect to the two rows of nipples 58 thereabove. An outlet conduit 60 bearing flow control valve 61 is provided on the lower end of the vessel 17.

In operation, contact material particles are supplied from hopper 18 through leg 45 into the seal chamber 22. The contact material passes from the seal chamber 22, through conduits 24, directly onto the surface of the column of contact material within the conversion chamber 23. The temperature of the contact material so supplied to the conversion chamber should be suitable for supporting the intended hydrocarbon conversion. Liquid or mixed phase hydrocarbon charge is sprayed into the gas space 27 from spray devices 41 and/or 43. The spray of liquid hydrocarbons is limited to the central portion of the vessel cross-sectional area. On the other hand, the conduits 24 through which the hot contact material charge enters are positioned only along the outer periphery of the chamber instead of being uniformly spaced throughout the cross-sectional area of the chamber. In this manner, contact between liquid charge and hot metal surfaces in the gas space 27 is limited so as to avoid the tendency for coke formation on such surfaces. While it is contemplated that all of the contact material supplied to the conversion zone may pass directly onto the surface of column 23 through the peripheral supply passages 24, which circumvent the central portion of the gas space 27, below the level of liquid spray, it has been found that the tendency for such coke formation may be still further avoided and the distribution of the liquid charge on the contact material may be greatly improved by also introducing contact material into the upper section of gas space 27 through conduit 26 at a rate controlled by the slide valve therebelow. The contact material passing from the conduit 26 which is horizontally centrally positioned falls onto the conical shaped baffle 39 and falls therefrom between the annular space between baffle 39 and skirt 38 as a shower of freely falling particles, which shower is restricted by means of the baffling substantially to only a central portion of the gas space 27 until the particles reach the surface 25 of the contact material column therebelow. Liquid or mixed phase hydrocarbon charge from spray device 41 and/or 43 is sprayed into that central portion of the gas space 27 within which said shower of particles is maintained so that the liquid hydrocarbon charge substantially all of the liquid charge or alternatively any portion which tends to stray toward the housing walls is uniformly deposited upon the showering contact material particles and prevented from reaching the hot metal surfaces adjacent the outer periphery of space 27. The contact material particles from the shower soon uniformly distribute themselves across the entire column cross-sectional area so as to provide uniform contacting of the liquid hydrocarbons with all the contact material. This latter further improvement is the subject matter of claims in United States Patent Number 2,574,850, issued November 13, 1951. The present application is particularly concerned with the broader improvement of spraying liquid oil charge into the conversion zone at a location or locations centrally disposed of the vessel horizontal cross-section and spaced above the surface of the contact material column while supplying a confined stream or streams of fresh contact material directly onto the column at a location or locations near the outer periphery of the conversion zone in such a manner as to avoid the path of the falling liquid oil spray.

If desired, in operations wherein the charge stock is partially vaporizable at the desired conversion temperature, the charge may be subjected to a preliminary fractionation to separate the heavy liquid portion of the charge from the vaporizable portion. Then the liquid may be introduced in heated condition through nozzles 41 and/or 43 and the heated hydrocarbon vapor charge may be separately introduced to the converter through conduit 8. The contact material and liquid hydrocarbons pass downwardly through the conversion zone and the liquid hydrocarbons are converted to gaseous hydrocarbon products. It will be understood that the term "gaseous" as used herein in describing and in claiming this invention is used in a broad sense as meaning material in the gaseous phase under existing operating conditions regardless of the normal phase of that material under ordinary atmospheric conditions. Gaseous conversion products are separately withdrawn from the lower section of the conversion zone through collector troughs 48 and 49 and pipes 51 and 52, and 51' and 52', respectively. The flow in the pipes 51, 52, 51' and 52' is throttled so as to provide the proper flow of products from each row of collector troughs. Used contact material flows downwardly through the partition arrangement 57, 58 and 59 in the lower end of vessel 17 and is withdrawn through outlet conduit 60 at a rate controlled by valve 61. The partition arrangement 57, 58 and 59 is such as will insure uniform withdrawal of contact material from all portions of the chamber cross-sectional area in the conversion zone thereabove. It will be noted that the rate of contact material withdrawal through conduit 60 is equal to the sum of the rate of contact material introduction through conduit 26 and through conduits 24. In further improved method and apparatus claimed in Patent Number 2,574,850, issued November 13, 1951, the major portion of the contact material charge is introduced through the central conduit 26 so that most of the contact material charged may be immediately contacted with the liquid phase hydrocarbons sprayed into the gas space 27 as said contact material showers downwardly through the central core of said gas space. In such an operation, it is important to maintain the level of the surface of the column of contact material substantially constant within the conversion zone. This is automatically accomplished in the operation described hereinabove since the contact material flow in pipes 24 is automatically throttled only by the column surface level. Thus, only as much contact material passes through conduits 24 as is required to maintain the column surface level substantially at 25 as shown. In order to prevent escape of hydrocarbon vapors from the conversion zone into seal chamber 22 an inert seal gas such as steam or flue gas may be introduced through conduit 46 into the seal chamber 22 at a rate so controlled by diaphragm operated valve 64 and differential pressure controller 65 as to maintain an inert gaseous atmosphere in zone 22 at a pressure slightly higher (for example ¼–½ pound per square inch) than the pressure in gas space 27. An inert purge gas such as steam or flue gas may be introduced through conduit 67 below partition 54 to strip hydrocarbons from the outflowing contact material. Spent or used contact material passes via conduit 60 into conveyor 19 by which it is conducted to vessel 10. If the contact material is an adsorbent catalyst, air or other oxygen containing gas is introduced at 11 into vessel 10 to burn the carbonaceous contaminant from the contact material. Flue gas may be withdrawn at 13. A suitable heat exchange fluid introduced at conduit 12 and withdrawn at conduit 14 may be passed through tubes within vessel 10 which communicate with conduits 12 and 14 under conditions suitable to control the regenerating catalyst temperature below a heat damaging level. For clay type adsorbents the heat damaging level is of the order of 1200° F. while for gel-type catalysts it may be somewhat higher. Regenerated contact material flows via conduit 16 to conveyor 20 by which it is returned to reactor supply hopper 18.

A somewhat modified form of the invention may be seen in Figure 3 wherein there is shown only the upper section of a conversion vessel 70 having a seal chamber 71 positioned thereabove. It will be understood that provision for gaseous product and used contact material withdrawal from vessel 70 may be provided in its lower section (not shown) substantially as is shown for vessel 17 in Figure 1. The seal chamber 71 is separated from the conversion vessel and conduits 73 are provided for contact material flow from chamber 71 to the surface of the column of contact material in chamber 70. It will be noted that the conduits 73 do not pass through the gas space 27 within the upper section of vessel 70 at all but enter vessel 70 only at a plurality of points around its periphery substantially at the level at which it is desired to maintain the surface of the contact material column. By this construction, any chance for liquid hydrocarbon charge to contact the hot metal surface of the contact material feed pipes before the column of contact material is reached is eliminated. Contact material may also be supplied, if desired, to the central portion of the converter cross-sectional area through conduit 74. The throttle device and conical baffle below the lower end of conduit 74 are substantially the same as those same devices shown in Figure 1. The skirt 75 differs from the skirt 38 of Figure 1 in that it is not tapered inwardly, a feature which is not in all cases necessary.

Turning now to Figure 4, there is shown an arrangement somewhat similar to that shown in Figure 3, except that the central catalyst curtain is omitted. Like elements in Figures 3 and 4 bear like numbers and will not be further identified. In the system shown in Figure 4, the liquid or mixed phase hydrocarbon charge is sprayed downwardly through only a central portion of the space 27, which portion is entirely free of hot contact material supply passages and spaced a substantial distance away from the housing walls. The spray may be supplied by one nozzle as shown or by a number of nozzles. In either case the nozzles should be arranged a substantial distance above the column surface and positioned only in the central portion of the horizontal cross-section of the gas space. The contact material is delivered to the column surface through a plurality of passages 73 which completely circumvent the gas space 27 and connect into the side of converter housing initially at the surface level of the column 23 and discharge the hot contact material at a plurality of points around the column periphery. The conduits 73 comprise the sole means for contact material supply to the column 23 so that not only the central portion of, but the entire gas space 27 is left free of hot contact material supply passages.

It will be noted that the column surface converges downwardly and inwardly from the peripheral contact material feed conduits towards the central vertical axis of the conversion zone. Thus for a vessel of circular cross-section the column surface takes the shape of an inverted cone, the sides of which slope in accordance with the angle of repose of the contact material. The angle of repose will fall within the range about 30–45 degrees with the horizontal depending upon the shape and size of the contact material particles.

The vaporized conversion products disengage from the lower section of the column 23 under conical hoods 100 and then pass via apertures 101 into pipes 102 through which the vapors flow into the plenum space 103 below the inverted conical shaped partition 111. If desired several vertically spaced rows of disengaging hoods 100 may be arranged on withdrawal pipes 102 as shown in United States Patent 2,459,096, issued January 11, 1949. It will be understood that the hoods 100 are uniformly spaced over the entire vessel horizontal cross-section so as to promote uniform withdrawal of vapor from all portions of the column cross-section. The conversion products in the gaseous phase leave the plenum space 103 via conduit 105. Contact material is withdrawn from the bottom of column 23 via conduits 104 which are uniformly distributed over the entire horizontal cross-section of the conversion zone. The contact material is delivered by conduits 104 onto bed 106 from the bottom of which it is uniformly withdrawn by pipes 107 and annular withdrawal funnel 108. The gas withdrawal plenum system is described and claimed in United States Patent 2,458,498, issued January 11, 1949.

It should be noted that in the arrangement modified in accordance with the present invention the partition 111 and the arrangement of hoods 100 parallel the configuration of the surface level of column 25. In this manner the hydrocarbon reactant is caused to flow through an equal depth of the column 23 in all portions of the horizontal cross-section, in spite of the conical configuration of the column surface. It will be understood that for vessels of cross-sectional shape other than circular the downwardly converging column surface will take an inverted pyramidal shape having as many sides as the confining housing.

The conditions of operation in the apparatus of this invention will vary widely depending upon the particular operational application involved. In general, the contact material should be supplied at a temperature suitable to support the conversion desired. This temperature will vary somewhat depending upon the particular contact material to oil ratio chosen. In catalytic cracking operations on clay-type catalysts, the contact material charge to oil charge ratio may vary from about 1.0 to 20 parts by weight of contact material per part of oil. The oil space velocity may be within the range of about 0.3 to 10.0 volumes of oil (measured at 60° F.) per hour per volume of contact material column within the conversion zone. The contact material in the case of catalytic cracking operations may enter the conversion chamber at temperatures of the order of 800° F. to 1200° F., and may undergo a temperature drop of the order of 15° F. to 300° F. in passing through the conversion zone. In the case of thermal cracking operations over inert contact materials, the contact material temperature may be much higher.

When the central shower of contact material is omitted in the system of this invention, then all of the hot contact material supply will be delivered directly onto the surface of the column of contact material in the conversion zone.

When contact material is showered centrally through the liquid oil feed space as well as being supplied directly onto the column surface at points around its periphery, the amount of contact material entering through conduits 24 (Figure 1) should be of the order of about 20 to 50 percent of the total contact material passed through the converter, the remainder of the contact material being supplied through conduit 26 (Figure 1). In the process of this invention it has been found desirable to control the contact material particle size broadly within the range 3 to 100 mesh and preferably within the range about 4 to 20 mesh by Tyler standard screen analysis. The percentage of fines present in the contact material mass should be maintained as low as possible.

The invention may be employed for conversion of hydrocarbon charge stock which is partially vaporizable under the conversion conditions or it may be employed for the conversion of reduced crudes and the like which consist for the most part of hydrocarbons boiling above the desired average conversion temperature. It is usually preferable to heat the hydrocarbon charge to a temperature of the order of 600° F. to 900° F. before introducing it into the conversion chamber.

It should be understood that the particular details of apparatus construction and the examples of operating conditions and process applications of the invention given hereinabove are intended as illustrative and are in no way to be construed as limiting the scope of this invention except as it may be limited by the following claims.

I claim:

1. The method for conversion of high boiling liquid hydrocarbons comprising maintaining a substantially compact column of particle-form contact material at a suitable temperature for effecting the hydrocarbon conversion along a lower portion of a confined conversion zone, maintaining a gas space above said column in said conversion zone, spraying a high boiling hydrocarbon charge at least partially in the liquid phase into said gas space a substantial distance above the surface of said column and passing the liquid spray downwardly through only a substantially central portion of said gas space, passing said hydrocarbons downwardly into said column to effect conversion thereof to lower boiling hydrocarbons, withdrawing hydrocarbon products in the gaseous phase from the lower section of said column separately of the contact material, withdrawing contact material from the lower section of said column to promote downward movement of the particles therein, supplying contact material at a suitable conversion supporting temperature through a plurality of confined passages which circumvent the central portion of said gas space and discharge directly onto the surface of said column only at a plurality of points near the periphery thereof, said confined passages being the only confined passages delivering contact material directly onto the surface of said column, whereby substantial contact of the liquid spray and the contact material passages is avoided.

2. The method for conversion of high boiling liquid and mixed phase hydrocarbons in the presence of a moving particle-form solid contact material which method comprises, maintaining a substantially compact column of particle-form contact material along a lower portion of a confined conversion zone, maintaining a gas space in said zone above the surface of said column, spraying a high boiling hydrocarbon charge at least partially in the liquid phase downwardly within only a central portion of said gas space from a location a substantial distance above the surface of said column and positioned only substantially centrally with respect to the horizontal cross-sectional area of said conversion zone, passing said hydrocarbons downwardly through a portion of said column of contact material in said zone to effect conversion to lower boiling gasiform hydrocarbons, withdrawing said gasiform hydrocarbons from said conversion zone, maintaining a confined accumulation of particle-form contact material at a level above said conversion zone, supplying contact material to said accumulation at a temperature high enough to support the hydrocarbon conversion in said conversion zone, passing contact material through confined passages leading downwardly from said accumulation and discharging the contact material directly upon the surface of said column only at points near its periphery, while entirely circumventing the central portion of said gas space, the central portion of said gas space being free of contact material supply passages below the location of liquid spray, whereby contact of liquid charge with confined passages for hot contact material supply is substantially avoided, maintaining an inert gaseous blanket within said confined accumulation above said conversion zone to prevent flow of hydrocarbons thereinto and withdrawing spent contact material from the lower section of said conversion zone.

3. The method for conversion of high boiling liquid hydrocarbons comprising maintaining a substantially compact column of particle-form contact material at a suitable temperature for effecting the hydrocarbon conversion along a lower portion of a confined conversion zone, maintaining a gas space above said column in said conversion zone, spraying a high boiling hydrocarbon charge in the liquid phase downwardly from a location spaced a substantial distance above the surface of said column so that the liquid passes downwardly through only a central portion of said gas space, leaving the surrounding outer portion of the gas space substantially free of liquid spray, separately introducing a vaporized hydrocarbon charge into said gas space and passing it downwardly toward said column, passing the vapor and liquid hydrocarbons downwardly within said column to effect conversion thereof to lower boiling hydrocarbons, withdrawing the lower boiling hydrocarbon products from the lower section of said column, withdrawing particle-form contact material from the lower section of said column and delivering contact material to said column at a suitable conversion supporting temperature as a plurality of confined streams which circumvent the central portion of said gas space and discharge directly onto the surface of said column at points spaced around its periphery, the central portion of said gas space being free of contact material delivery streams at least below said location from which the liquid hydrocarbon is sprayed.

4. The method for conversion of high boiling liquid and mixed feed hydrocarbons in the presence of a moving particle-form solid contact material which method comprises, maintaining a substantially compact column of particle-form contact material along a lower portion of a conversion zone which is defined by an elongated housing, maintaining a gas space in said housing above the surface of said column maintaining a confined accumulation of particle-form contact material at a level above said housing, supplying contact material to said accumulation at a temperature high enough to support the hydrocarbon conversion in said conversion zone, passing contact material downwardly from said accumulation through confined passages which entirely circumvent that portion of the housing occupied by said gas space and which initially enter said housing at the surface level of said column so as to deliver the contact material directly onto the surface of said column at a plurality of points spaced near the outer periphery of said column, said passages being the only passages for delivery of contact material directly to the surface of said column, withdrawing contact material downwardly from the lower section of said conversion zone so as to promote downward flow of the contact material in said column, spraying a high boiling hydrocarbon charge at least partially in the liquid phase into a centrally located portion of the gas space above said column, passing said hydrocarbons downwardly into said column and through a portion thereof to effect conversion of said hydrocarbons to lower boiling hydrocarbons, withdrawing hydrocarbon products in the gaseous phase from a lower portion of said column and maintaining an inert gaseous pressure in said confined accumulation above said conversion zone at a pressure above the gaseous pressure in the upper portion of said conversion zone.

5. A method for conversion of high boiling liquid hydrocarbons comprising, maintaining a substantially compact column of particle-form contact material at a suitable temperature for effecting the hydrocarbon conversion along a lower portion of a confined conversion zone, maintaining a gas space above said column in said conversion zone, spraying a high boiling hydrocarbon charge at least partially in the liquid phase downwardly in said gas space above said column, passing said hydrocarbons downwardly into said column to effect conversion thereof to lower boiling hydrocarbons, withdrawing hydrocarbon products in the gaseous phase from said conversion zone separately of the contact material, withdrawing contact material from the lower section of said column to promote downward movement of the particles therein and delivering hot contact material onto said column as at least one confined stream which entirely circumvents said gas space and initially enters the conversion zone substantially at the surface level of said column so as to discharge the hot contact material directly onto the surface of said column at at least one point near the outer periphery of said column, the hot contact material being discharged from confined streams directly onto the surface of said column only at points near the periphery of said column as aforesaid, whereby contact of the liquid charge with the confined streams is avoided until the liquid charge reaches said column.

6. The method of claim 5 characterized in that the contact material discharged directly onto the column near the periphery thereof is the only contact material supplied to said column.

7. The method for conversion of high boiling liquid hydrocarbons which comprises maintaining a substantially compact column of particle-form contact material at a suitable temperature for effecting the hydrocarbon conversion along a lower portion of a confined conversion zone, maintaining a gas space above said column in said conversion zone, supplying hot contact material at a conversion supporting temperature to said column as a plurality of confined gravitating streams which circumvent the central portion of said gas space and discharge the contact material onto the column at the lower end of said gas space at a plurality of space points near the periphery of said column, the contact material discharging from said streams being the only contact material supplied to said column, whereby the surface of said column converges downwardly and inwardly from its periphery toward its central vertical axis in conformance with the angle of repose of the contact material, withdrawing contact material from the lower section of the conversion zone so as to effect downward movement of the contact material in said column, spraying a high boiling hydrocarbon charge at least partially in the liquid state downwardly toward the column surface from only a central location in said gas space which is spaced a substantial distance above the column surface, the central portion of said gas space being free of confined contact material supply streams, passing the hydrocarbons downwardly through said column to effect conversion of said hydrocarbons to lower boiling products, withdrawing the lower boiling products in the gaseous phase from a plurality of points arranged in the lower section of said column, in a downwardly converging pattern paralleling the surface of said column, whereby the depth for path for hydrocarbon flow through the column is substantially equal entirely across the column cross-section.

8. An apparatus for conducting the conversion of high boiling liquid hydrocarbons to lower boiling hydrocarbons in the presence of a moving particle-form contact material which apparatus comprises, means defining an elongated conversion chamber adapted for confining a compact column of particle-form contact material, means to withdraw contact material from the lower portion of said conversion chamber, liquid spray means positioned substantially centrally of the cross-sectional area of said conversion chamber near the upper end of said chamber, said spray means being the only means for liquid feed within said chamber, means to supply a liquid hydrocarbon charge to said spray means, means to withdraw gaseous material from the lower section of said conversion chamber, an accumulation chamber for contact material located above said conversion chamber, means to supply contact material to said accumulation chamber, and a plurality of conduits extending downwardly from said accumulation chamber and terminating on their open lower ends within the upper section of said conversion chamber a substantial distance below said spray means at a plurality of spaced points all near the horizontal periphery of said conversion chamber, said conduits circumventing the central portion of the cross-section of said conversion chamber which is below the level of said spray means and the central portion of said chamber below said spray means being free of conduits of any type.

9. An apparatus for conducting the conversion of high boiling liquid hydrocarbons in the presence of a moving contact material which comprises, an elongated conversion chamber adapted to confine a column of particle-form contact material, a plurality of solid material feed conduits terminating on their lower ends at a plurality of points within said chamber spaced around and near its horizontal periphery and located in the upper section of said chamber but substantially below its upper end, said conduits entirely circumventing the central portion of the chamber above their lower ends and being the only conduits for contact material supply into said chamber, means to withdraw the contact material from the lower section of said chamber, a liquid spray device positioned within the upper section of said chamber above the level of the lower ends of said solid feed conduits, said spray device being positioned substantially centrally of the chamber cross-sectional area and said chamber being free of spray devices except in the central portion of its horizontal cross-sectional areas, means to supply liquid oil charge to said spray device, and means to separately withdraw gaseous hydrocarbons from the lower section of said chamber.

10. An apparatus for conducting the conversion of high boiling liquid hydrocarbons in the presence of a moving contact material which comprises, an elongated conversion chamber adapted to confine a column of particle-form contact material, a liquid spray device positioned within the upper section of said vessel centrally of the horizontal cross-sectional area of said chamber, said chamber being free of spray devices except in the central portion of its horizontal cross-sectional area, means to supply liquid oil charge to said spray device, means to separately withdraw gaseous hydrocarbons from the lower section of said chamber, a plurality of solid feed conduits terminating on their open lower ends in a plurality of points within said chamber spaced around and near its horizontal periphery and spaced a substantial distance below said spray device, said conduits circumventing at least that central portion of the chamber cross-section situated below said spray device so as to leave said central portion free of solid material feed conduits and means to withdraw contact material from the lower section of said chamber.

11. An apparatus for conducting the conversion of high boiling liquid hydrocarbons in the presence of a moving contact material which comprises, means defining an elongated conversion chamber adapted to confine a column of particle-form contact material, a plurality of solid material inlet conduits connecting through the side of said chamber from the outside thereof at a level spaced substantially below its upper end at a plurality of points spaced around the horizontal periphery of said chamber, means to withdraw contact material from the lower section of said chamber, a liquid spray device positioned centrally in the upper section of said chamber above the level of entry of solid inlet conduits, said chamber being free of liquid spray devices except in the central portion of its horizontal cross-sectional area and being free of solid material inlet conduits below the level of said spray device except as aforesaid.

References Cited in the file of this patent

UNITED STATES PATENTS

| | | |
|---|---|---|
| 2,416,214 | Payne | Feb. 18, 1947 |
| 2,432,344 | Sinclair | Dec. 9, 1947 |
| 2,439,372 | Simpson | Apr. 6, 1948 |
| 2,534,090 | Weber et al. | Dec. 12, 1950 |
| 2,538,472 | Robinson | Jan. 16, 1951 |